April 27, 1954     H. H. BASHOR     2,676,524
TWO-WAY PLOW
Filed March 18, 1949     3 Sheets-Sheet 2
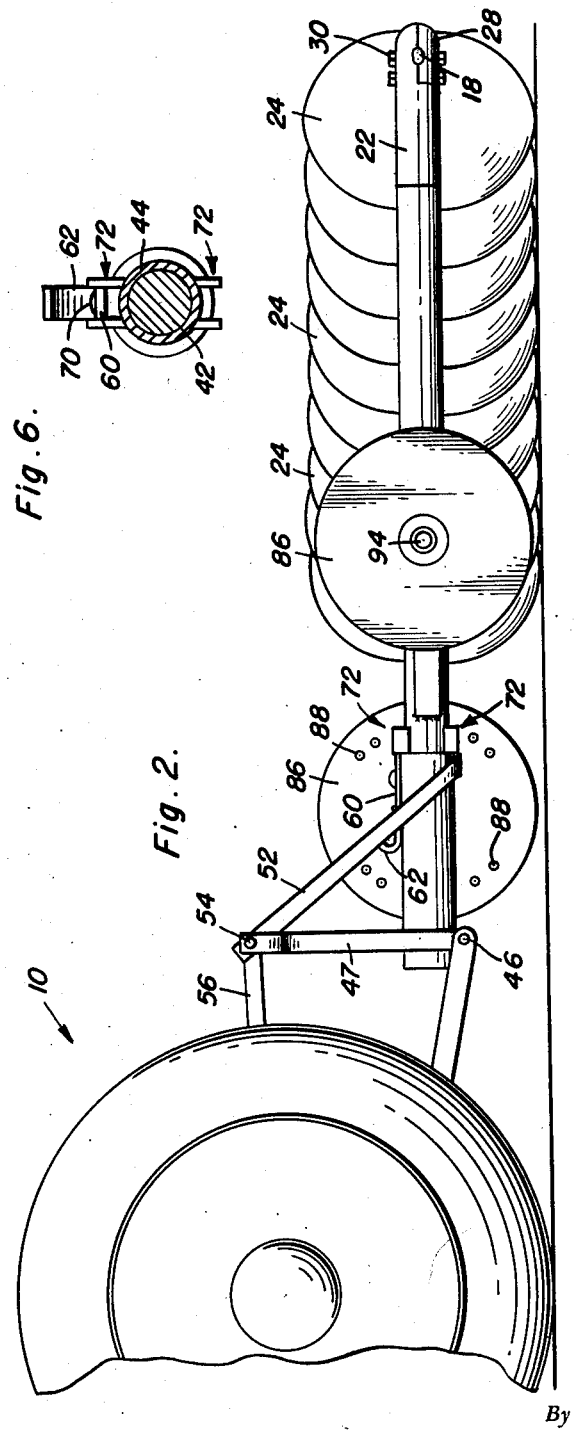
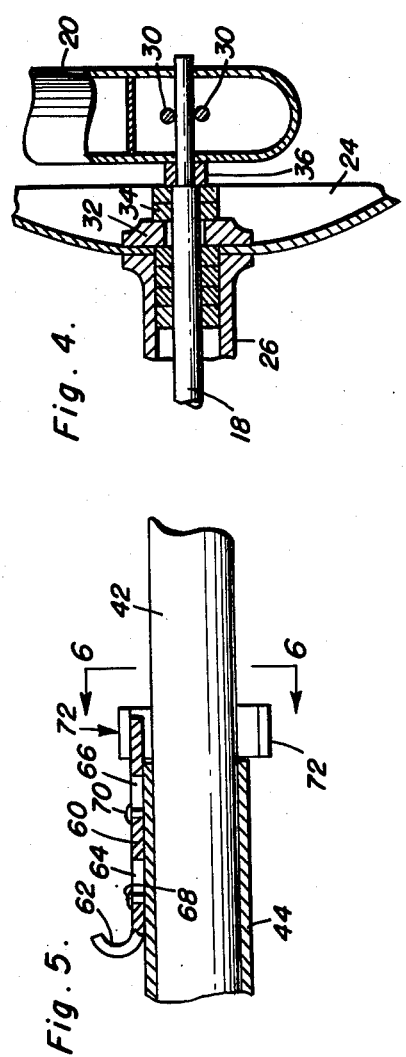
Inventor
Harley H. Bashor April 27, 1954
H. H. BASHOR
2,676,524
TWO-WAY PLOW
Filed March 18, 1949
3 Sheets-Sheet 3
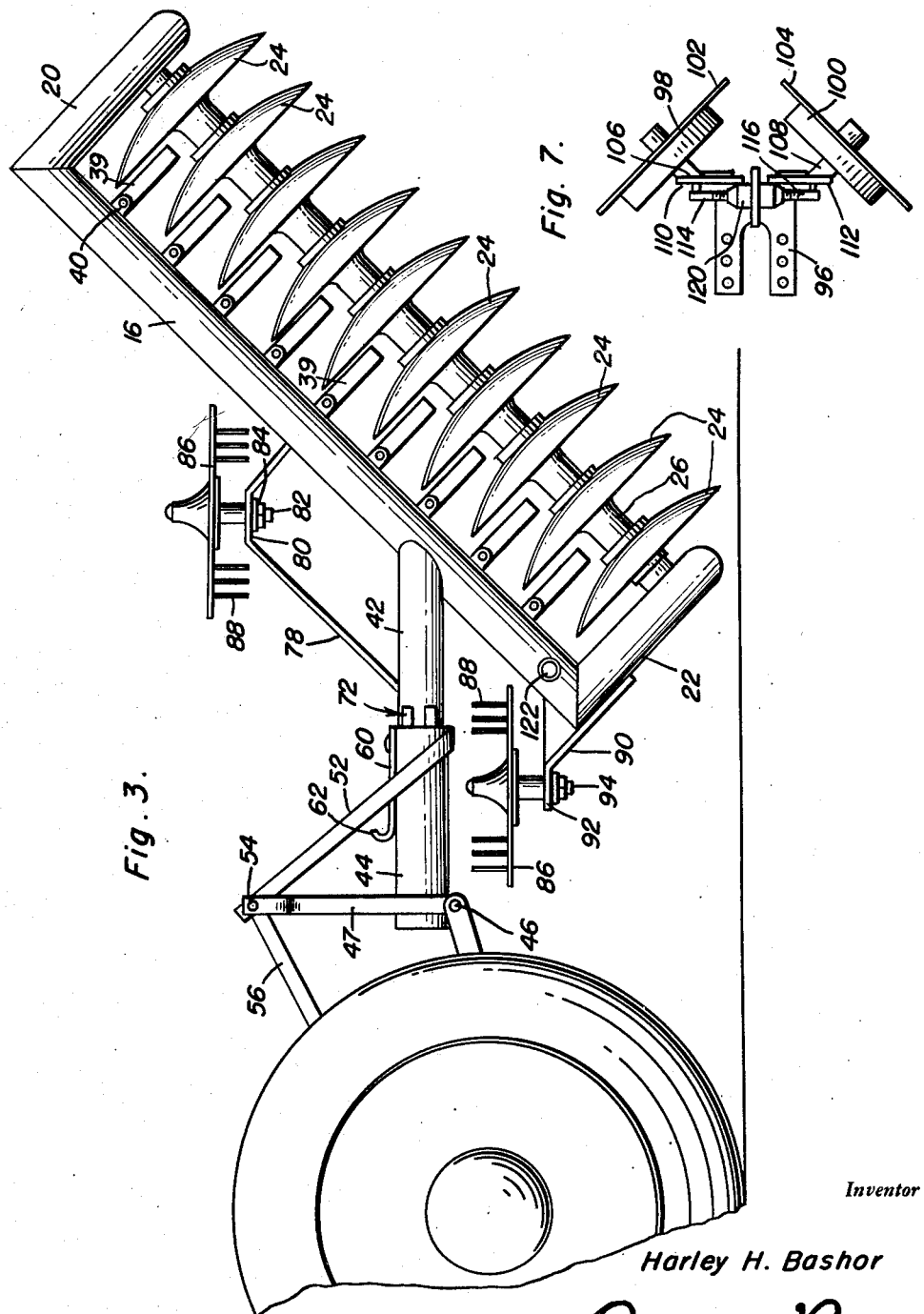
Inventor
Harley H. Bashor Patented Apr. 27, 1954

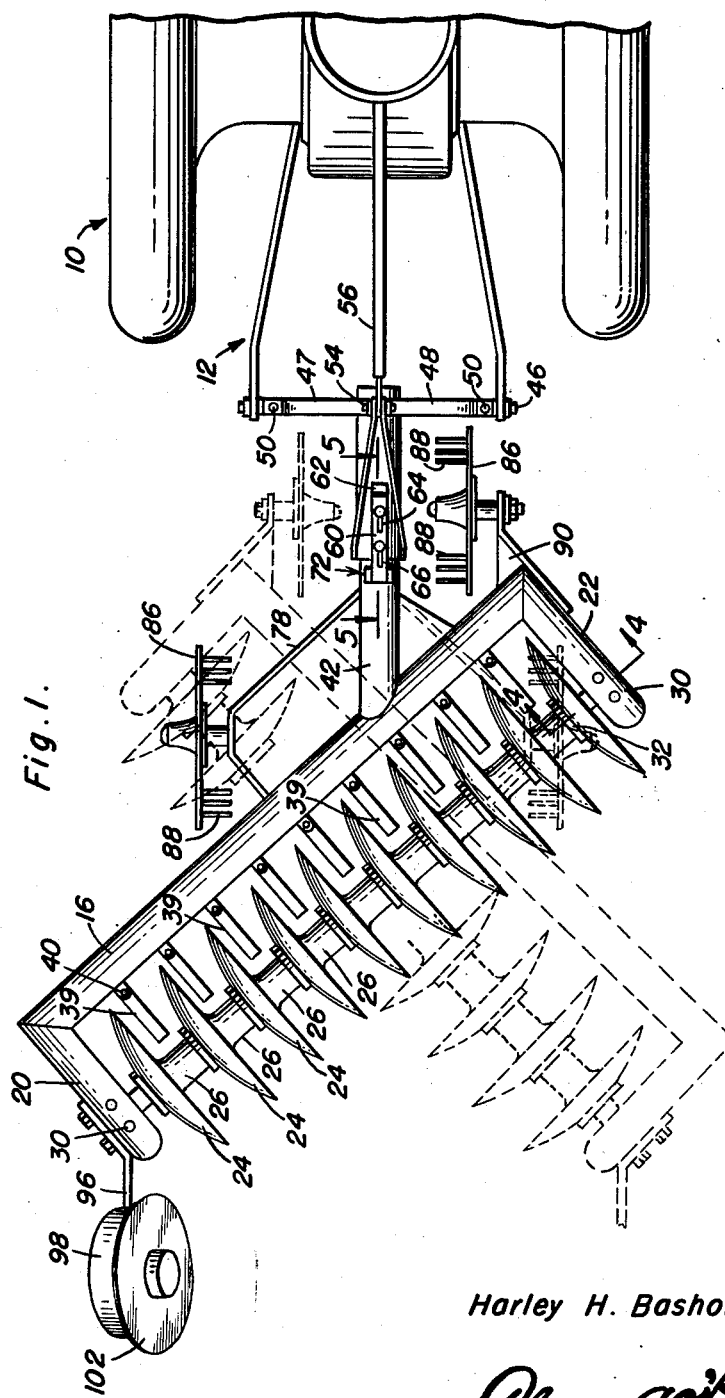

2,676,524

UNITED STATES PATENT OFFICE 2,676,524

TWO-WAY PLOW

Harley H. Bashor, Amarillo, Tex.

Application March 18, 1949, Serial No. 82,126

8 Claims. (Cl. 97—26)

This invention appertains to novel and useful improvements in attachments for use in conjunction with cultivating.

An object of this invention is to support a plow at the rear of a tractor or other prime mover in such a fashion that it may be used for plowing in two directions by simple manipulation of the plow.

Another object of this invention is to provide an improved plow for use in cultivating land, which is rotatably disposed at the rear end of a tractor and maintained in position by means of a readily releasable latch mechanism, whereby it may be rotated 180°, the plow disks being disposed at an angle with respect to the line of travel of the tractor, whereby complete and effective plowing operations may be made on a field by an easy and quickly effected adjustment.

Ancillary objects and features of novelty will become apparent to those skilled in the art, in following the description of the preferred form of the invention, illustrated in the accompanying drawings, wherein:

Figure 1 is a plan view of the preferred form of the invention, a second position of operation being shown in phantom of the device;

Figure 2 is an elevational view of the device shown in Figure 1 taken from the side thereof;

Figure 3 is an elevational side view of the device shown in Figure 1, showing the attachment in a second position;

Figure 4 is a sectional view illustrating details of construction and taken on the line 4—4 of Figure 1 and in the direction of the arrows;

Figure 5 is a sectional view illustrating detail of the fastening and latch assembly forming an important part of the present invention;

Figure 6 is a sectional view of the detail of construction shown in Figure 5 and taken substantially on the line 6—6 of Figure 5 and in the direction of the arrows; and, Figure 7 is an elevational view of an attachment removably carried by the plow structure for use in connection with heavy work under adverse conditions of plowing.

It is one of the intents of the present invention to simplify farming operations. Hence, a device has been developed for the purpose of simplifying plowing operations whereby a single device may be used for plowing in two directions by successive runs over the particular portion of the field to be plowed with the plow being disposed in one position on one run and rotated substantially 180° during another run.

In order to be practical and commercially feasible, an attachment for a tractor must be versatile. The present attachment for a tractor plows either right or left, deep or shallow, heavy or light and is used in connection with plowing ditches, grades, hillsides and may be used for filling on any type of land and may also be used for making irrigation ditches. Terracing is easily accomplished by use of the instant plow which is so arranged as to accommodate various attachments as found desirable.

By the arrangement for supporting the disks, any type may be easily, readily and conveniently employed and substituted for others to accommodate the various jobs that are necessary. The size or concavity of the disks is a matter to be determined by the person using the attachment.

A tractor which is of conventional description and generally indicated at 10 is provided with a conventional tow bar construction indicated generally at 12.

A plow which includes a frame 16 of substantially U-shaped configuration is supplied and has a central shaft 18 carried thereby. This shaft is disposed in the legs 20 and 22 respectively of the said U-shaped frame and has a number of disks 24 disposed in spaced relation thereon. The said disks are spaced by means of collars 26 which are mounted on the said shaft 18. Means for retaining the ends of the shaft 18 in position is provided and may be seen best in Figure 2 as the bearing structure 28 having bolts 30 passed therethrough. Suitable thrust bearings 32, 34 and 36 respectively are disposed on the ends of the said shaft 18 between the said legs 20 and 22 and the initial disk 24 at each end of the series.

A number of arms 39 are disposed on suitable brackets 40 for pivotal movement. The said brackets are in turn fixed to the said frame 16 and the said arms 39 are so located as to be pivotable to a position for cleaning the disks 24 during the operation of the device.

Disposed in a vertical plane which is in nonparallel relation with respect to the transverse axis of the frame 16 is a tongue 42 preferably of circular cross section so that it may be rotatable freely in the sleeve 44 when it is found desirable. The sleeve 44 is disposed on a cross member 46 forming a portion of the tow bar assembly. Braces 47 and 48 are removably carried by the tow bar construction but are fixed thereto by any suitable means such as the bolts 50, illustrated in Figure 1. These braces 47 and 48 respectively converge at an apex portion. Disposed between the convergent ends thereof are the ends of a second brace 52 which is disposed beneath the opposite end of the sleeve 44 and fixed thereto as by welding. A bolt or pin 54 passing through all of the ends of the bracing may also pass through the thrust bar 56 of the conventional tow bar construction for raising and lowering the entire assembly.

A latch means is provided in association with the tongue 42 and the sleeve 44. The preferable latch means consists of a latch bar or latch 60 (Figure 5) having a finger receiving upturned end portion 62 and a pair of spaced slots 64 and 66 respectively in the make-up thereof. Pins 68 and 70 respectively are carried by the sleeve 44, extending through the slots 64 and 66 respectively and terminating in heads to prevent the loss of the latch 60 but yet allow sliding movement thereof. The end of the latch 60 opposite the finger grip portion 62 is slidable under sets of latch keepers indicated generally at 72 which are in fact pairs of small angle members rigidly fixed to the tongue 42 as by welding or the like. Hence, the latch 60 may be slid in locking engagement with any one of the number of pairs of latch keepers to retain the device in the position as shown in Figure 1 (full lines) or as shown in Figure 1 (phantom). Further, an additional set of keepers may be supplied in order to retain the device as shown in Figure 3, this position finding utility in transporting the plow from one location to another without actually plowing the land. The conventional lifting mechanism of the tractor may be used for raising the plow and holding it in the elevated position in order to transport it from one location to another and it may be found unnecessary to add additional keepers to maintain the device in the position as shown in Figure 3. In that event the illustration of Figure 3 would be simply a disclosure of how the device is rotated through the 180° travel.

A bracket 78 is fixed to the frame at one end and the tongue 42 at the other end. This bracket has a portion 80 thereof substantially parallel to the longitudinal axis of the tongue 42. In this portion 80 is is an aperture (unnumbered) for accommodation of a bolt 82. A nut 84 is disposed on the bolt which supports a depth gage 86 which is in the form of a disk having a number of prongs or tines 88 projecting therefrom. An identical depth gage 86 is carried by the frame 16 and at a corner thereof. A bracket 90 is rigidly attached to the corner of the frame by welding, brazing or any other suitable means and has a portion 92 substantially parallel to the longitudinal axis of the tongue 42. It is in this portion 92 that the bolt 94 of the last mentioned depth gage is mounted. Hence, the depth gage disks are substantially parallel to the line of travel of the tractor when the device is in the operative position but they are in echelon relation in order to prevent lashing of the entire implement when it is being pulled through the field, this being an ancillary function of the depth gages.

In operation, the implement is attached to a tractor as described. The tractor is then motivated across a field which is to be plowed. At the end of a single path or a predetermined travel, the latch mechanism is released and the plow rotated approximately 180° and latched in the desired position. Then, the travel is retraced for plowing in the opposite direction. In this operation the depth gages not only limit the depth of the disks 24 but also due to their echelon arrangement prevent a material amount of the lashing or side thrust which is attendant upon such operations.

When it is desired to move the plow from one position to another and in so doing refrain from plowing operations, the device may be swung to the position as shown in Figure 3 thereby raising the plow from the ground. If on the other hand, it is felt that the plow need not be raised in this manner, the conventional lifting mechanism for the tow bar construction may be elevated. For long travels however, the former method is more desirable.

Referring primarily to Figure 7, an attachment for the plow frame is illustrated. This attachment is a stabilizer and may act in the secondary capacity of a depth gage. It is used in extremely adverse plowing conditions and may be used with or without the illustrated stabilizers or depth gages. The specific purpose of the attachment shown in Figure 7 is to prevent the plow from creeping away from the extremely heavy land or land which is very soggy.

It consists of a suitable mounting bracket 96 which is bifurcated at one end thereof and which has a number of openings therein accommodating bolts or the like. The exact attachment to the frame is illustrated in Figures 1 and 7. At the end opposite the bifurcations there is a pair of disks 98 and 100 respectively which have circular flanges 102 and 104 extending therefrom. Small shafts 106 and 108 respectively which converge toward each other are carried by shoes 110 and 112 respectively. These shoes have screws 114 and 116 respectively fixed thereto and a large internally threaded turnbuckle type sleeve 120 is threadedly disposed on both of the screws 114 and 116 respectively. By rotation of the sleeve 120 the shoes are urged outwardly with respect to each other and the stabilizer members or drums are moved therewith.

In the operation with attachment applied to the tractor frame appropriate adjustment is made by operating the sleeve 120 to spread the angularly disposed (with respect to each other) members 98 and 100 respectively.

The frame being made at least in part of tubular construction has a filler plug 122 therein whereby water may be supplied in the frame in order to lend additional weight to the structure. If necessary a discharge plug or valve may be provided. However, in practical operation the frame need only be reversed so that the filler plug acts in the nature of a drain in order to empty the frame of the ballast.

It is appreciated that certain variations may be made without departing from the spirit of the invention. Hence, limitation is sought only in accordance with the scope of the following claims.

Having described the invention, what is claimed as new is:

1. In a farm implement which includes an elongated frame, a tongue secured to said frame adjacent one end of the frame and inclined relative to the frame, a bracket adapted to support a depth gage, said bracket being substantially U-shaped and having leg portions secured to said tongue and said frame to thereby rigidly connect said frame and said tongue, said bracket extending from the tongue toward the end of the frame remote from said tongue, a sleeve adapted to be secured to a tractor, said tongue being mounted for rotation in said sleeve so that said frame may be moved to selected positions, and means operatively connected with said tongue and said sleeve for releasably locking said tongue in selected positions in said sleeve, said locking means comprising a latch member slidably disposed on said sleeve, and keepers secured to said tongue between which said latch is adapted to pass.

2. The combination of claim 1 and said keepers being arranged in pairs around the periphery of said tongue.

3. In a farm implement, an elongated frame having first and second end portions, a cylindrical tongue permanently fixed adjacent the first end portion of said frame and remote from the second end portion of said frame, said tongue being disposed at an inclined angle relative to the frame and defining an included acute angle with said first end portion, a sleeve adapted to be secured to the lift mechanism of a tractor, said tongue being rotatably mounted in said sleeve, means operatively connected with said sleeve and said tongue for retaining the tongue rotatably adjusted in the sleeve, and a substantially U-shaped bracket having a central portion and a pair of leg portions joined by said central portion, one of said leg portions being fixed to said tongue and the other of said leg portions being fixed to an intermediate portion of said frame, said central portion paralleling said tongue and adapted to support a depth gage.

4. The combination of claim 3 wherein said frame includes a hollow portion having an opening and a filler plug in said opening whereby water may be introduced into said hollow portion for adding weight to the frame.

5. In a tractor including a lift mechanism at the rear thereof, a farm implement including a horizontal sleeve secured to said mechanism and remaining horizontal throughout raising and lowering of the sleeve by said mechanism, a plow supporting frame, a tongue fixed to the frame and positioned in said sleeve for rotation, means operatively connected with the sleeve and the tongue for locking the tongue in a selected rotated position in said sleeve, and a bracket secured to and bracing the tongue to the frame and including a portion paralleling said tongue and adapted to support a depth gage.

6. In a tractor including a lift mechanism at the rear thereof, a farm implement comprising a horizontal bearing sleeve secured to said lift mechanism, a substantially U-shaped frame including first and second end portions, a tongue fixed to said frame closer to said first end portion than said second end portion and being rotatably supported in said bearing sleeve, said tongue extending outwardly and forwardly from said frame, means forming a connection between said sleeve and said tongue for locking the latter in a selected rotated position in the sleeve, a substantially U-shaped bracket having legs fixed to said tongue and an intermediate portion of the frame and including a central portion adapted to support a depth gage, a shaft supported on said frame, disks on the shaft, and means mounted on the frame adjacent the disks for cleaning said disks.

7. In a farm implement which includes an elongated frame, a tongue fixedly secured to said frame adjacent one end of the frame and at an inclined angle to the frame, a bracket adapted to support a depth gage, said bracket being substantially U-shaped and having leg portions secured to said tongue and said frame to thereby rigidly connect said frame and said tongue, said bracket extending from the tongue toward the end of the frame remote from said tongue, and said bracket including a portion paralleling said tongue and joining said leg portions and supporting the depth gage.

8. In a farm implement which includes an elongated frame, a tongue fixedly secured to said frame adjacent one end of said frame, a bracket adapted to support a depth gage, said bracket being substantially U-shaped and having its leg portions secured to said tongue and said frame to thereby rigidly connect said frame and said tongue, said bracket extending from the tongue toward the end of said frame remote from said tongue, said bracket including a portion joining said leg portions and paralleling said tongue and supporting the depth gage, a sleeve adapted to be secured to a tractor, said tongue being mounted for rotation in said sleeve so that said frame may be moved to selected positions, and means operatively connected with said tongue and said sleeve for releasably locking said tongue in selected positions in said sleeve.

References Cited in the file of this patent

UNITED STATES PATENTS

| Number | Name | Date |
|---|---|---|
| 897,216 | Macphail | Aug. 25, 1908 |
| 1,104,502 | Hist | July 21, 1914 |
| 1,467,894 | Dubois | Sept. 11, 1923 |
| 1,578,084 | Neufang | Mar. 23, 1926 |
| 2,055,632 | Petty et al. | Sept. 29, 1936 |
| 2,227,366 | Pridgen | Dec. 31, 1940 |
| 2,543,786 | Lindeman | Mar. 6, 1951 |
| 2,591,711 | Moore | Apr. 8, 1952 |

FOREIGN PATENTS

| Number | Country | Date |
|---|---|---|
| 18,032 | Australia | Aug. 13, 1934 |
| 463,000 | France | Dec. 6, 1913 |
| 660,922 | France | Feb. 26, 1929 |
| 875,681 | France | June 29, 1942 |
| 358,261 | Germany | Sept. 8, 1922 |
| 1,150 | Great Britain | 1872 |